(12) United States Patent
Wang et al.

(10) Patent No.: US 12,047,663 B2
(45) Date of Patent: Jul. 23, 2024

(54) LENS MODULE AND CAMERA

(71) Applicant: Huawei Technologies Co., Ltd., Shenzhen (CN)

(72) Inventors: Qingping Wang, Shenzhen (CN); Ruihua Li, Shenzhen (CN); Xiaogang Song, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 809 days.

(21) Appl. No.: 17/077,247

(22) Filed: Oct. 22, 2020

(65) Prior Publication Data

US 2021/0044729 A1 Feb. 11, 2021

Related U.S. Application Data

(63) Continuation of application No. PCT/CN2018/120211, filed on Dec. 11, 2018.

(30) Foreign Application Priority Data

Apr. 25, 2018 (CN) .......................... 201810382951.8

(51) Int. Cl.
*G02B 5/04* (2006.01)
*G02B 5/08* (2006.01)
(Continued)

(52) U.S. Cl.
CPC .............. *H04N 23/55* (2023.01); *G02B 5/04* (2013.01); *G02B 5/0883* (2013.01); *G02B 27/64* (2013.01)

(58) Field of Classification Search
CPC .... G02B 13/00; G02B 13/0065; G02B 27/64; G02B 27/646; G02B 5/04; G02B 5/0883; (Continued)

(56) References Cited

U.S. PATENT DOCUMENTS

| 3,468,229 A | 9/1969 | Bellows |
| 4,258,395 A | 3/1981 | Nodov |

(Continued)

FOREIGN PATENT DOCUMENTS

| CN | 1225180 A | 8/1999 |
| CN | 1945416 A | 4/2007 |

(Continued)

OTHER PUBLICATIONS

Anonymous: "Tilt (optics)" wikipedia, Oct. 22, 2010, XP055855424, 2 pages.

*Primary Examiner* — Antoinette T Spinks
(74) *Attorney, Agent, or Firm* — Conley Rose, P.C.

(57) ABSTRACT

A lens system and a camera, where the lens system includes a first refractive element, a second refractive element, a reflecting element, and a photosensitive element, where the first refractive element and the reflecting element are disposed along a direction of a first optical axis, the second refractive element and the reflecting element are disposed along a direction of a second optical axis, the first optical axis is perpendicular to the second optical axis, the second refractive element and the photosensitive element are disposed in parallel, an effective aperture diameter of the first refractive element is greater than an effective aperture diameter of the second refractive element in a height direction of the lens system, and the first optical axis is parallel to the height direction of the lens system.

11 Claims, 15 Drawing Sheets

(51) Int. Cl.
H04N 23/55 (2023.01)
G02B 27/64 (2006.01)

(58) Field of Classification Search
CPC ...... G02B 7/08; G02B 13/0035; G03B 17/17; G03B 30/00; H04N 23/55; H04N 23/685

See application file for complete search history.

(56) References Cited

U.S. PATENT DOCUMENTS

| | | |
|---|---|---|
| 10,234,659 B2 | 3/2019 | Yao et al. |
| 2004/0141065 A1 | 7/2004 | Hara et al. |
| 2005/0254110 A1* | 11/2005 | Inagaki ................ G02B 26/125 |
| | | 359/214.1 |
| 2007/0035631 A1 | 2/2007 | Ueda |
| 2007/0183043 A1 | 8/2007 | Bito et al. |
| 2008/0144171 A1 | 6/2008 | Eromaki |
| 2008/0291543 A1 | 11/2008 | Nomura et al. |
| 2009/0046366 A1 | 2/2009 | Take |
| 2009/0122406 A1 | 5/2009 | Rouvinen et al. |
| 2009/0208195 A1 | 8/2009 | Hatakeyama |
| 2012/0314299 A1 | 12/2012 | Tashiro et al. |
| 2015/0198784 A1 | 7/2015 | Bone et al. |
| 2017/0227785 A1 | 8/2017 | Chan et al. |
| 2017/0276914 A1 | 9/2017 | Yao et al. |
| 2018/0299691 A1 | 10/2018 | Awazu et al. |
| 2021/0400193 A1* | 12/2021 | Ma ....................... H04N 23/698 |
| 2023/0053416 A1* | 2/2023 | Choi ....................... G02B 9/04 |
| 2024/0085672 A1* | 3/2024 | Kim ....................... G02B 13/00 |

FOREIGN PATENT DOCUMENTS

| | | |
|---|---|---|
| CN | 101013192 A | 8/2007 |
| CN | 101256345 A | 9/2008 |
| CN | 201174018 Y | 12/2008 |
| CN | 101369048 A | 2/2009 |
| CN | 101510005 A | 8/2009 |
| CN | 102819097 A | 12/2012 |
| CN | 105122129 A | 12/2015 |
| CN | 105785556 A | 7/2016 |
| CN | 106950792 A | 7/2017 |
| CN | 207051573 U | 2/2018 |
| EP | 2917783 A4 | 7/2016 |
| JP | 2000292692 A | 10/2000 |
| JP | 2009526257 A | 7/2009 |
| JP | 2009300620 A | 12/2009 |
| WO | 9749003 A1 | 12/1997 |
| WO | 2006018885 A1 | 2/2006 |
| WO | 2013125603 A1 | 8/2013 |
| WO | 2017110341 A1 | 6/2017 |

\* cited by examiner

007
LENS MODULE AND CAMERA

CROSS-REFERENCE TO RELATED APPLICATIONS

This application is a continuation of International Patent Application No. PCT/CN2018/120211 filed on Dec. 11, 2018, which claims priority to Chinese Patent Application No. 201810382951.8 filed on Apr. 25, 2018. The disclosures of the aforementioned applications are hereby incorporated by reference in their entireties.

TECHNICAL FIELD

This application relates to the field of photographing device technologies, and in particular, to a lens module and a camera.

BACKGROUND

With increasing popularization of terminal devices, photographing has become an indispensable function of a terminal device. Because a current terminal device is increasingly thin, the overall height of a camera on the terminal device is correspondingly limited.

A folded structure is used for the camera on the terminal device. An incident light ray is reflected by an optical element before entering a refractive element in a lens module. An optical axis of the refractive element is perpendicular to a height direction of the refractive element.

However, because the height of the camera is limited by the overall thickness of the terminal device, an effective aperture diameter of the refractive element is relatively small, and a relatively small aperture can be implemented. Consequently, it is difficult to achieve a wide-aperture effect, and user experience is relatively poor.

SUMMARY

Embodiments of this application provide a lens module and a camera, to more easily achieve a wide-aperture effect and improve user experience.

In view of this, a first aspect of the embodiments of this application provides a lens module, including a first refractive element, a second refractive element, a reflecting element, and a photosensitive element. The first refractive element and the reflecting element are disposed along a direction of a first optical axis. The second refractive element and the reflecting element are disposed along a direction of a second optical axis. The first optical axis is an optical axis of the first refractive element, the second optical axis is an optical axis of the second refractive element, and the first optical axis is perpendicular to the second optical axis. The second refractive element and the photosensitive element are disposed in parallel. An effective aperture diameter of the first refractive element is greater than an effective aperture diameter of the second refractive element in a height direction of the lens module. The first optical axis is parallel to the height direction of the lens module, and the second optical axis is perpendicular to the height direction of the lens module.

The first refractive element is configured to refract a light beam from outside of the lens module.

The reflecting element is configured to reflect the light beam refracted by the first refractive element.

The second refractive element is configured to refract the light beam reflected by the reflecting element.

The photosensitive element is configured to receive a light ray refracted by the second refractive element and generate an electronic image.

In the foregoing manner, a light ray from the outside of the lens module first enters the first refractive element. The first optical axis is parallel to the height direction of the lens module, and the second optical axis is perpendicular to the height direction of the lens module. That is, the effective aperture diameter of the second refractive element is limited by the height of the lens module, the effective aperture diameter of the first refractive element is not limited by the height of the lens module, and the effective aperture diameter of the first refractive element is greater than the effective aperture diameter of the second refractive element. Therefore, the lens module can implement a larger aperture, and this makes it more easily to achieve a wide-aperture effect, and improves user experience.

A second aspect of the embodiments of this application provides a lens module, including a first refractive element, a second refractive element, a reflecting element, a photosensitive element, a target optical element, and a motor. The first refractive element and the reflecting element are disposed along a direction of a first optical axis. The second refractive element and the reflecting element are disposed along a direction of a second optical axis. The second refractive element is located between the reflecting element and the target optical element. The first optical axis is an optical axis of the first refractive element, the second optical axis is an optical axis of the second refractive element, and the first optical axis is perpendicular to the second optical axis. An effective aperture diameter of the first refractive element is greater than an effective aperture diameter of the second refractive element in a height direction of the lens module. The first optical axis is parallel to the height direction of the lens module, and the second optical axis is perpendicular to the height direction of the lens module.

The first refractive element is configured to refract a light beam from outside of the lens module.

The reflecting element is configured to reflect the light beam refracted by the first refractive element.

The second refractive element is configured to refract the light beam reflected by the reflecting element.

The motor is configured to adjust a position of the target optical element to change an optical path between the second refractive element and the photosensitive element.

The photosensitive element is configured to receive a light ray emitted from the target optical element and generate an electronic image.

In the foregoing manner, a light ray from the outside of the lens module first enters the first refractive element. The first optical axis is parallel to the height direction of the lens module, and the second optical axis is perpendicular to the height direction of the lens module. That is, the effective aperture diameter of the second refractive element is limited by the height of the lens module, the effective aperture diameter of the first refractive element is not limited by the height of the lens module, and the effective aperture diameter of the first refractive element is greater than the effective aperture diameter of the second refractive element. Therefore, the lens module can implement a larger aperture, and this makes it more easily to achieve a wide-aperture effect, and improves user experience. In addition, the motor can adjust the position of the target optical element to change the optical path between the second refractive element and the photosensitive element, that is, a focusing function or an image stabilization function can be implemented without changing positions of other elements in the lens module. This improves practicability of this solution.

With reference to the second aspect of the embodiments of this application, in a first implementation of the second aspect of the embodiments of this application, the target optical element includes a first wedge-shaped prism and a second wedge-shaped prism. The second refractive element, the target optical element, and the photosensitive element are disposed along the direction of the second optical axis. The first wedge-shaped prism and the second wedge-shaped prism are located between the second refractive element and the photosensitive element. The motor is configured to adjust a position of the first wedge-shaped prism and/or a position of the second wedge-shaped prism to change an optical path of a light ray in the target optical element.

In the embodiments of this application, a specific form of the target optical element is provided to implement the focusing function of the lens module. This improves implementability of this solution.

With reference to the second aspect of the embodiments of this application, in a second implementation of the second aspect of the embodiments of this application, the target optical element includes a first plane mirror and a second plane mirror. The first plane mirror and the second plane mirror are perpendicularly disposed. The second refractive element and the first plane mirror are disposed along the direction of the second optical axis, and the second refractive element is located between the reflecting element and the first plane mirror. The second plane mirror and the photosensitive element are disposed along a direction of a third optical axis, and the third optical axis is parallel to the second optical axis. An included angle between the first plane mirror and the second optical axis is 45° and an included angle between the second plane mirror and the second optical axis is 45° such that a light ray refracted by the second refractive element is projected onto the photosensitive element after being reflected by the first plane mirror and the second plane mirror in sequence. The motor is configured to adjust a position of the first plane mirror and/or a position of the second plane mirror to change an optical path of a light ray in the target optical element.

In the embodiments of this application, another specific form of the target optical element is provided to implement the focusing function of the lens module. This improves flexibility of this solution.

With reference to the second aspect of the embodiments of this application, in a third implementation of the second aspect of the embodiments of this application, the target optical element includes a first plane mirror and a second plane mirror. The first plane mirror and the second plane mirror are disposed in parallel. The second refractive element and the first plane mirror are disposed along the direction of the second optical axis, and the second refractive element is located between the reflecting element and the first plane mirror. The second plane mirror and the photosensitive element are disposed along a direction of a third optical axis, and the third optical axis is parallel to the second optical axis. An included angle between the first plane mirror and the second optical axis is 45° and an included angle between the second plane mirror and the second optical axis is 45° such that a light ray refracted by the second refractive element is projected onto the photosensitive element after being reflected by the first plane mirror and the second plane mirror in sequence. The motor is configured to adjust a position of the first plane mirror and/or a position of the second plane mirror to change an optical path of a light ray in the target optical element.

In the embodiments of this application, another specific form of the target optical element is provided to implement the focusing function of the lens module. This improves flexibility of this solution.

With reference to the second aspect of the embodiments of this application, in a fourth implementation of the second aspect of the embodiments of this application, the target optical element includes a triangular prism. The second refractive element is disposed along the direction of the second optical axis. The photosensitive element is disposed along a direction of a third optical axis, and the third optical axis is parallel to the second optical axis. The triangular prism is disposed on a same side of the second refractive element and the photosensitive element, and a bottom surface of the triangular prism is parallel to the second refractive element and the photosensitive element such that a light ray refracted by the second refractive element is projected onto the photosensitive element after being reflected by the triangular prism. The motor is configured to adjust a position of the triangular prism to change an optical path of a light ray in the target optical element.

In the embodiments of this application, another specific form of the target optical element is provided to implement the focusing function of the lens module. This improves flexibility of this solution.

With reference to the second implementation of the second aspect of the embodiments of this application, in a fifth implementation of the second aspect of the embodiments of this application, when the lens module shakes, the motor is configured to adjust the positions of the first plane mirror and the second plane mirror to change the optical path of the light ray in the target optical element.

In the embodiments of this application, a specific form of the target optical element is provided to implement the image stabilization function of the lens module. This improves implementability of this solution.

With reference to the third implementation of the second aspect of the embodiments of this application, in a sixth implementation of the second aspect of the embodiments of this application, when the lens module shakes, the motor is configured to adjust the positions of the first plane mirror and the second plane mirror to change the optical path of the light ray in the target optical element.

In the embodiments of this application, another specific form of the target optical element is provided to implement the image stabilization function of the lens module. This improves flexibility of this solution.

With reference to the fourth implementation of the second aspect of the embodiments of this application, in a seventh implementation of the second aspect of the embodiments of this application, when the lens module shakes, the motor is configured to adjust the position of the triangle prism to change the optical path of the light ray in the target optical element.

In the embodiments of this application, another specific form of the target optical element is provided to implement the image stabilization function of the lens module. This improves flexibility of this solution.

With reference to the second aspect of the embodiments of this application, the first implementation of the second aspect of the embodiments of this application, the second implementation of the second aspect of the embodiments of this application, the third implementation of the second aspect of the embodiments of this application, the fourth implementation of the second aspect of the embodiments of this application, the fifth implementation of the second aspect of the embodiments of this application, the sixth implementation of the second aspect of the embodiments of this application, and the seventh implementation of the second aspect of the embodiments of this application, in an eighth implementation of the second aspect of the embodiments of this application, the first refractive element includes at least one refractive lens, the second refractive element includes at least one refractive lens, and all refractive lenses in the first refractive element are parallel to each other, and all refractive lenses in the second refractive element are parallel to each other.

According to the solution provided in the embodiments of this application, the first refractive element and the second refractive element each include the at least one refractive lens. That is, the first refractive element and the second refractive element each may include a plurality of refractive lenses. This enhances a possibility of implementing this solution.

With reference to the second aspect of the embodiments of this application, the first implementation of the second aspect of the embodiments of this application, the second implementation of the second aspect of the embodiments of this application, the third implementation of the second aspect of the embodiments of this application, the fourth implementation of the second aspect of the embodiments of this application, the fifth implementation of the second aspect of the embodiments of this application, the sixth implementation of the second aspect of the embodiments of this application, and the seventh implementation of the second aspect of the embodiments of this application, in a ninth implementation of the second aspect of the embodiments of this application, the reflecting element is a plane mirror, and when the lens module shakes, the motor is configured to adjust an included angle between the plane mirror and the first refractive element to change an optical path between the first refractive element and the second refractive element.

In the embodiments of this application, a specific form of the reflecting element is provided to implement the image stabilization function of the lens module. This improves implementability of this solution.

With reference to the second aspect of the embodiments of this application, the first implementation of the second aspect of the embodiments of this application, the second implementation of the second aspect of the embodiments of this application, the third implementation of the second aspect of the embodiments of this application, the fourth implementation of the second aspect of the embodiments of this application, the fifth implementation of the second aspect of the embodiments of this application, the sixth implementation of the second aspect of the embodiments of this application, and the seventh implementation of the second aspect of the embodiments of this application, in a tenth implementation of the second aspect of the embodiments of this application, the reflecting element is a prism, and when the lens module shakes, the motor is configured to adjust an included angle between the prism and the first refractive element to change an optical path between the first refractive element and the second refractive element.

In the embodiments of this application, another specific form of the reflecting element is provided to implement the image stabilization function of the lens module. This improves flexibility of this solution.

With reference to the second aspect of the embodiments of this application, the first implementation of the second aspect of the embodiments of this application, the second implementation of the second aspect of the embodiments of this application, the third implementation of the second aspect of the embodiments of this application, the fourth implementation of the second aspect of the embodiments of this application, the fifth implementation of the second aspect of the embodiments of this application, the sixth implementation of the second aspect of the embodiments of this application, and the seventh implementation of the second aspect of the embodiments of this application, in an eleventh implementation of the second aspect of the embodiments of this application, a physical focal length of the lens module is greater than or equal to 9 millimeters (mm), and an optical magnification of the lens module is greater than or equal to 2.5.

In the embodiments of this application, a group of specific parameters about the focal length and the optical magnification of the lens module are provided. This improves practicability of this solution.

With reference to the second aspect of the embodiments of this application, the first implementation of the second aspect of the embodiments of this application, the second implementation of the second aspect of the embodiments of this application, the third implementation of the second aspect of the embodiments of this application, the fourth implementation of the second aspect of the embodiments of this application, the fifth implementation of the second aspect of the embodiments of this application, the sixth implementation of the second aspect of the embodiments of this application, and the seventh implementation of the second aspect of the embodiments of this application, in a twelfth implementation of the second aspect of the embodiments of this application, the lens module further includes an infrared cut-off filter, and the infrared cut-off filter is located between the target optical element and the photosensitive element.

A third aspect of the embodiments of this application provides a camera, including a processor, a controller, a memory, a bus, and a lens module. The processor, the controller, the memory, and the lens module are connected to each other through the bus. The memory is configured to store a program and an instruction. The processor is configured to invoke the program and the instruction stored in the memory, and the processor is further configured to control the lens module using the controller.

The lens module includes a first refractive element, a second refractive element, a reflecting element, and a photosensitive element. The first refractive element and the reflecting element are disposed along a direction of a first optical axis. The second refractive element and the reflecting element are disposed along a direction of a second optical axis. The first optical axis is an optical axis of the first refractive element, the second optical axis is an optical axis of the second refractive element, and the first optical axis is perpendicular to the second optical axis. The second refractive element and the photosensitive element are disposed in parallel. An effective aperture diameter of the first refractive element is greater than an effective aperture diameter of the second refractive element in a height direction of the lens module. The first optical axis is parallel to the height direction of the lens module, and the second optical axis is perpendicular to the height direction of the lens module.

The first refractive element is configured to refract a light beam from outside of the lens module.

The reflecting element is configured to reflect the light beam refracted by the first refractive element.

The second refractive element is configured to refract the light beam reflected by the reflecting element.

The photosensitive element is configured to receive a light ray refracted by the second refractive element and generate an electronic image.

A fourth aspect of the embodiments of this application provides a camera, including a processor, a controller, a memory, a bus, and a lens module. The processor, the controller, the memory, and the lens module are connected to each other through the bus. The memory is configured to store a program and an instruction. The processor is configured to invoke the program and the instruction stored in the memory, and the processor is further configured to control the lens module using the controller.

The lens module includes a first refractive element, a second refractive element, a reflecting element, a photosensitive element, a target optical element, and a motor. The first refractive element and the reflecting element are disposed along a direction of a first optical axis. The second refractive element and the reflecting element are disposed along a direction of a second optical axis. The second refractive element is located between the reflecting element and the target optical element. The first optical axis is an optical axis of the first refractive element, the second optical axis is an optical axis of the second refractive element, and the first optical axis is perpendicular to the second optical axis. An effective aperture diameter of the first refractive element is greater than an effective aperture diameter of the second refractive element in a height direction of the lens module. The first optical axis is parallel to the height direction of the lens module, and the second optical axis is perpendicular to the height direction of the lens module.

The first refractive element is configured to refract a light beam from outside of the lens module.

The reflecting element is configured to reflect the light beam refracted by the first refractive element.

The second refractive element is configured to refract the light beam reflected by the reflecting element.

The motor is configured to adjust a position of the target optical element to change an optical path between the second refractive element and the photosensitive element.

The photosensitive element is configured to receive a light ray emitted from the target optical element and generate an electronic image.

According to the foregoing technical solutions, it can be learned that the embodiments of this application have the following advantages.

In the embodiments of this application, a lens module includes a first refractive element, a second refractive element, a reflecting element, and a photosensitive element. The first refractive element and the reflecting element are disposed along a direction of a first optical axis. The second refractive element and the reflecting element are disposed along a direction of a second optical axis. The first optical axis is an optical axis of the first refractive element, the second optical axis is an optical axis of the second refractive element, and the first optical axis is perpendicular to the second optical axis. The second refractive element and the photosensitive element are disposed in parallel. An effective aperture diameter of the first refractive element is greater than an effective aperture diameter of the second refractive element in a height direction of the lens module. The first optical axis is parallel to the height direction of the lens module, and the second optical axis is perpendicular to the height direction of the lens module. The first refractive element is configured to refract a light beam from outside of the lens module. The reflecting element is configured to reflect the light beam refracted by the first refractive element. The second refractive element is configured to refract the light beam reflected by the reflecting element. The photosensitive element is configured to receive a light ray refracted by the second refractive element and generate an electronic image. In the foregoing manner, it can be learned that a light ray from the outside of the lens module first enters the first refractive element. The first optical axis is parallel to the height direction of the lens module, and the second optical axis is perpendicular to the height direction of the lens module. That is, the effective aperture diameter of the second refractive element is limited by the height of the lens module, the effective aperture diameter of the first refractive element is not limited by the height of the lens module, and the effective aperture diameter of the first refractive element is greater than the effective aperture diameter of the second refractive element. Therefore, the lens module can implement a larger aperture, and this makes it more easily to achieve a wide-aperture effect, and improves user experience.

DESCRIPTION OF EMBODIMENTS

Embodiments of this application provide a lens module and a camera, to more easily achieve a wide-aperture effect and improve user experience.

In the specification, claims, and accompanying drawings of this application, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments described herein can be implemented in other orders than the order illustrated or described herein. Moreover, the terms "include", "have" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, product, or device.

The embodiments of this application may be applied to a camera including a lens module. The camera may be integrated into a terminal device. The terminal device may further be user equipment having a photographing function, for example, a mobile phone, a tablet computer, a wearable device, an augmented reality (AR)\virtual reality (VR) device, a notebook computer, an ultra-mobile personal computer (UMPC), a netbook, or a personal digital assistant (PDA). This is not limited in the embodiments of this application.

Figure 1:
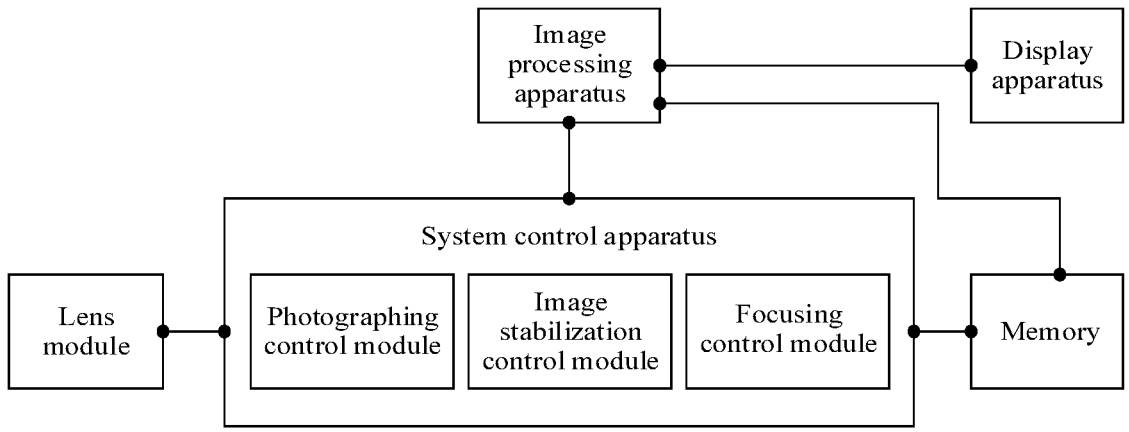
FIG. 1 is a schematic diagram of a photographing system applied to a terminal device.

Refer to FIG. 1. In addition to the lens module, the camera further includes at least a system control apparatus, an image processing apparatus, a memory, and a display apparatus.

The system control apparatus may further include a photographing control module, a focusing control module, and an image stabilization control module. The photographing control module is configured to set a photographing mode of the camera, for example, a monochrome mode or a high dynamic mode. The focusing control module is configured to control an autofocus motor to adjust positions of optical elements in the camera, to photograph objects at different distances. The image stabilization control module is configured to control an anti-shake motor to adjust the positions of the optical elements in the camera, to prevent an image of a photographed object from being blurred due to a reason such as hand shaking of a user.

The image processing apparatus may denoise, enhance, segment, or blur an original image obtained by the camera, to enrich user experience.

The memory may store a photo processed by the image processing apparatus and program code used to control an operation of the camera.

The display apparatus may present, to the user using a display screen, a final image obtained through photographing by the camera.

Nowadays, as a mobile phone is becoming lighter and more portable, the overall thickness of the mobile phone is increasingly thin. Therefore, the height of a camera on the mobile phone is limited by the overall thickness of the mobile phone. That is, an effective aperture diameter of an optical element in a lens module is limited. As a result, a longer focal length and a higher optical magnification cannot be implemented for the camera, and this makes it difficult to photograph a distant object using the camera, and difficult to obtain a photo with a wide-aperture effect.

Therefore, the embodiments of this application provide a lens module. The following describes the lens module in the embodiments of this application in detail with reference to the accompanying drawings.

Figure 2:
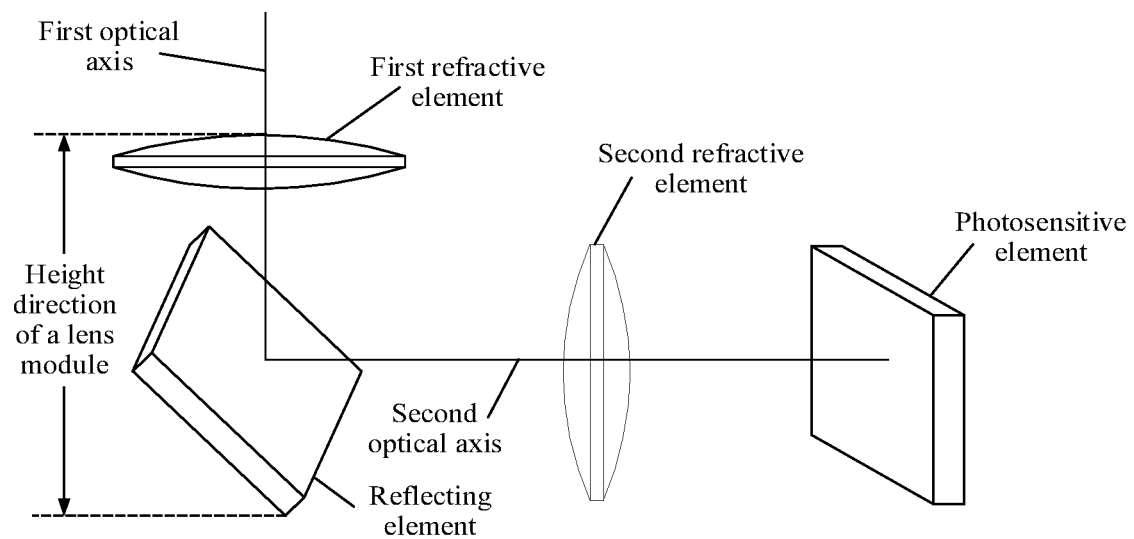
FIG. 2 is a schematic diagram of an embodiment of a camera according to this application.

FIG. 2 shows an embodiment of a lens module in the embodiments of this application. The lens module includes a first refractive element, a second refractive element, a reflecting element, and a photosensitive element. The first refractive element and the reflecting element are disposed along a direction of a first optical axis. The second refractive element and the reflecting element are disposed along a direction of a second optical axis. The first optical axis is an optical axis of the first refractive element, the second optical axis is an optical axis of the second refractive element, and the first optical axis is perpendicular to the second optical axis. The second refractive element and the photosensitive element are disposed in parallel. An effective aperture diameter of the first refractive element is greater than an effective aperture diameter of the second refractive element in a height direction of the lens module. The first optical axis is parallel to the height direction of the lens module, and the second optical axis is perpendicular to the height direction of the lens module.

It should be noted that the first refractive element, the reflecting element, and the second refractive element may be made of a plastic material. In addition, another transparent optical material may also be used. Moreover, the first refractive element and the second refractive element may be made of materials having different optical characteristics (for example, different dispersion coefficients and/or different refractive indexes).

It should be noted that an effective aperture diameter of an optical element is a physical aperture diameter used by the optical element to refract or reflect a light ray, and is different from an outer aperture diameter of the optical element. For example, for an optical element with a diameter of 10 mm, its outer aperture diameter is 10 mm, and its effective aperture diameter may be 6 mm.

In addition, in this embodiment, the first refractive element and the second refractive element may be circular lenses, or may be lenses in another shape, for example, an ellipse, a rectangle, or a rounded rectangle. This is not limited herein.

It may be understood that a light ray from outside of the lens module first enters the first refractive element, and the height direction of the lens module is the direction of the first optical axis. That is, a plane in which the first refractive element is located is perpendicular to the height direction of the lens module. Therefore, the effective aperture diameter of the first refractive element may not be limited by the height of the lens module.

In addition, a folded structure is used for the lens module in this embodiment of this application, and the plane in which the first refractive element is located is perpendicular to a plane in which the refractive element is located. Therefore, the reflecting element further needs to be disposed in the lens module, to reflect, onto the second refractive element, the light ray refracted by the first refractive element. Further, an included angle between a plane in which the reflecting element is located and the plane in which the first refractive element is located may be 45°.

It should be noted that the first refractive element is configured to refract the light ray from the outside of the lens module. Further, a symmetry axis of an incident light beam may coincide with or be parallel to the first optical axis. Then, the reflecting element may reflect, onto the second refractive element, the light ray refracted by the first refractive element. Further, a symmetry axis of the reflected light beam may coincide with or be parallel to the second optical axis. The light ray refracted by the second refractive element may be finally projected onto the photosensitive element, and an electronic image is generated.

Figure 3:
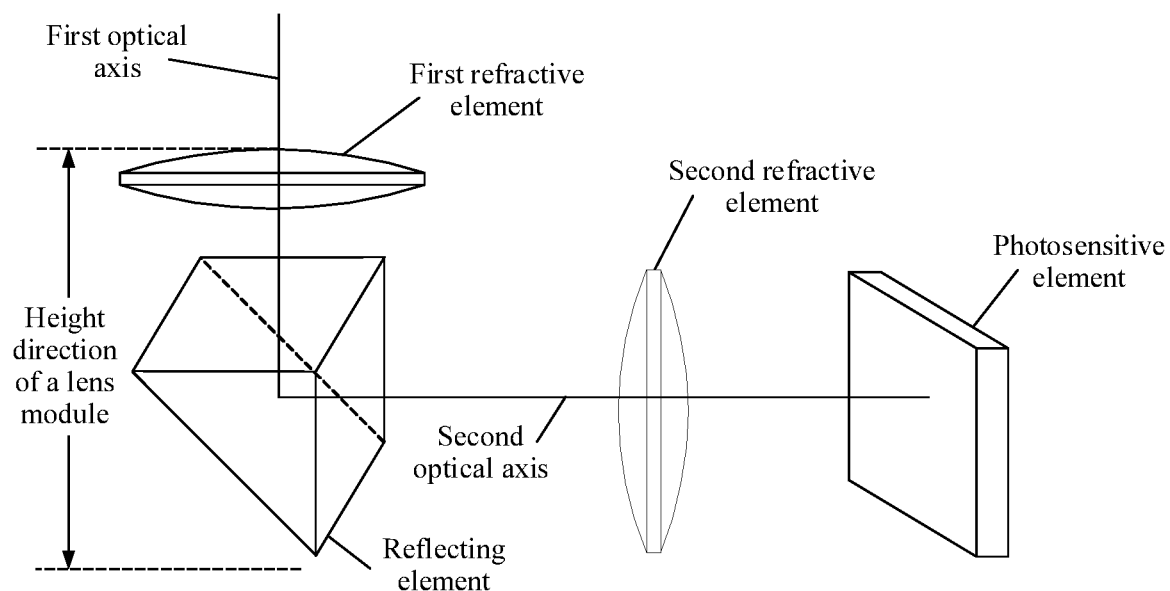
FIG. 3 is a schematic diagram of another embodiment of a camera according to this application.

Optionally, the reflecting element may be a plane mirror shown in FIG. 2, or may be in another form, for example, may be a prism shown in FIG. 3. An inclined plane of the prism is used as a reflecting surface. A specific form of the reflecting element is not limited herein.

Optionally, a physical focal length of the lens module is greater than or equal to 9 mm, and an optical magnification of the lens module is greater than or equal to 2.5.

Optionally, the first refractive element and the second refractive element in this embodiment are not necessarily single refractive elements, and may be combinations of a plurality of refractive elements. For example, the first refractive element and the second refractive element each may be constituted by a plurality of sequentially arranged lenses that are parallel to each other.

It may be understood that the photosensitive element is configured to perform optical-to-electrical conversion on an obtained light ray to generate a digital image. The photosensitive element may be a charge coupled device (CCD), or may be a metal oxide semiconductor (i.e., complementary metal-oxide-semiconductor (CMOS)). This is not limited herein.

It should be noted that the lens module may include an infrared cut-off filter located between the second refractive element and the photosensitive element. The infrared cut-off filter may be made of a fiber glass material. In addition, the lens module may further include another component other than the components shown and described.

In the foregoing manner, it can be learned that the light ray from the outside of the lens module first enters the first refractive element. The first optical axis is parallel to the height direction of the lens module, and the second optical axis is perpendicular to the height direction of the lens module. That is, the effective aperture diameter of the second refractive element is limited by the height of the lens module, the effective aperture diameter of the first refractive element is not limited by the height of the lens module, and the effective aperture diameter of the first refractive element is greater than the effective aperture diameter of the second refractive element. Therefore, the lens module can implement a larger aperture, and this makes it more easily to achieve a wide-aperture effect, and improves user experience.

Based on a structure of the lens module in this embodiment, an optical path between various optical elements in the lens module is relatively complex. Consequently, it is relatively difficult to implement a focusing function and an image stabilization function by moving the optical elements shown in FIG. 2 or FIG. 3. Therefore, based on FIG. 2 or FIG. 3, a target optical element and a motor may be further disposed in the lens module in this solution. The second refractive element is located between the reflecting element and the target optical element. A position of the optical element may be adjusted using the motor, to change an optical path between the second refractive element and the photosensitive element to implement the focusing function and the image stabilization function of the lens module.

The following separately describes specific forms of the target optical element with reference to the accompanying drawings.

Figure 4A:
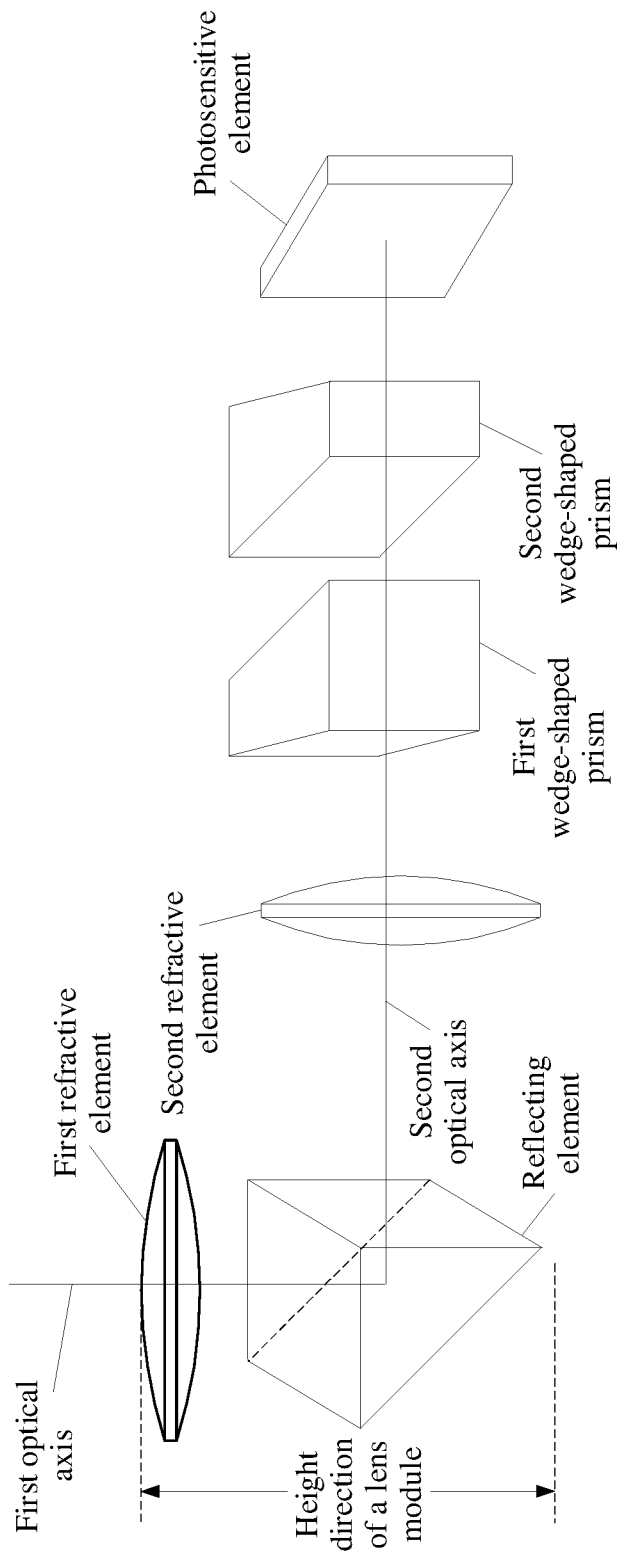
FIG. 4A is a schematic diagram of another embodiment of a camera according to this application.

Refer to FIG. 4A. The target optical element may include a first wedge-shaped prism and a second wedge-shaped prism. The second refractive element, the target optical element, and the photosensitive element are disposed along the direction of the second optical axis, and the first wedge-shaped prism and the second wedge-shaped prism are located between the second refractive element and the photosensitive element. It may be understood that the first wedge-shaped prism and the second wedge-shaped prism may be considered as two parts obtained by cutting a cuboid. Given space needs to be reserved between an inclined plane of the first wedge-shaped prism and an inclined plane of the second wedge-shaped prism, to avoid friction between the first wedge-shaped prism and the second wedge-shaped prism when the motor pushes the first wedge-shaped prism or the second wedge-shaped prism to move.

Figure 4B:
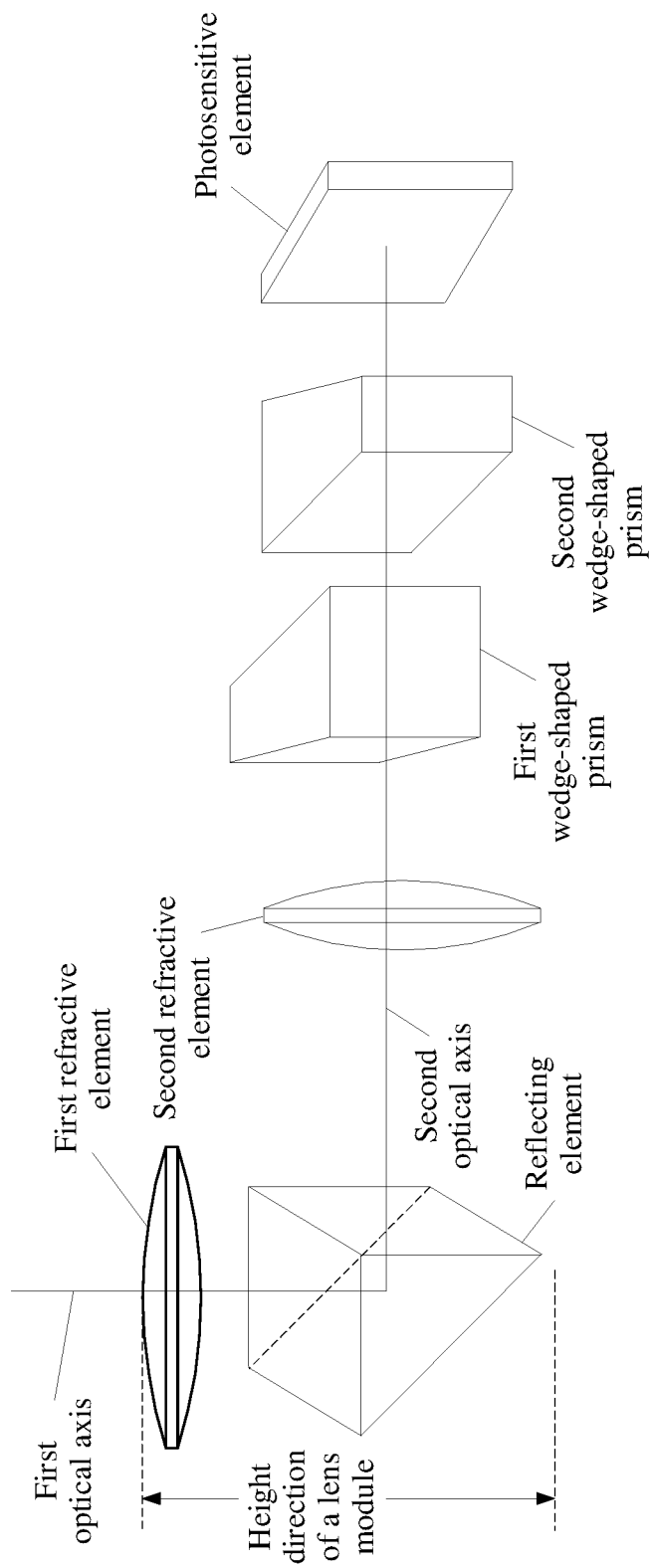
FIG. 4B is a schematic diagram of another embodiment of a camera according to this application.

It should be noted that an effective path along which a light ray passes through the first wedge-shaped prism and the second wedge-shaped prism may be changed by adjusting relative positions of the first wedge-shaped prism and the second wedge-shaped prism, that is, an optical path of the light ray in the target optical element is changed. For example, the second wedge-shaped prism remains unchanged, and the motor pushes the first wedge-shaped prism to move along a direction of the inclined plane of the first wedge-shaped prism, to implement the focusing function. For details, refer to FIG. 4B.

It may be understood that refractive indexes of materials of the first wedge-shaped prism and the second wedge-shaped prism are much greater than a refractive index of air, and when refraction occurs on an interface, angles at which light rays converge in the first wedge-shaped prism and the second wedge-shaped prism are different from an angle at which the light rays converge in the air. In this way, a path along which the light rays converge at a point changes, and focusing at different object distances is implemented. During focusing at a long object distance, the effective path along which the light ray passes through the first wedge-shaped prism and the second wedge-shaped prism is shortened (the overall thickness of the target optical element is reduced). During focusing at a long object distance, the effective path along which the light ray passes through the first wedge-shaped prism and the second wedge-shaped prism is lengthened (the overall thickness of the target optical element is increased).

Optionally, in this solution, the motor may alternatively push only the second wedge-shaped prism to move along a direction of the inclined plane of the second wedge-shaped prism, to change the optical path of the light ray in the target optical element to implement the focusing function.

Optionally, in this solution, the motor may alternatively push both the first wedge-shaped prism and the second wedge-shaped prism at the same time to respectively move along directions of the inclined planes of the first wedge-shaped prism and the second wedge-shaped prism to change their relative positions, to change the optical path of the light ray in the target optical element to implement the focusing function.

Figure 5A:
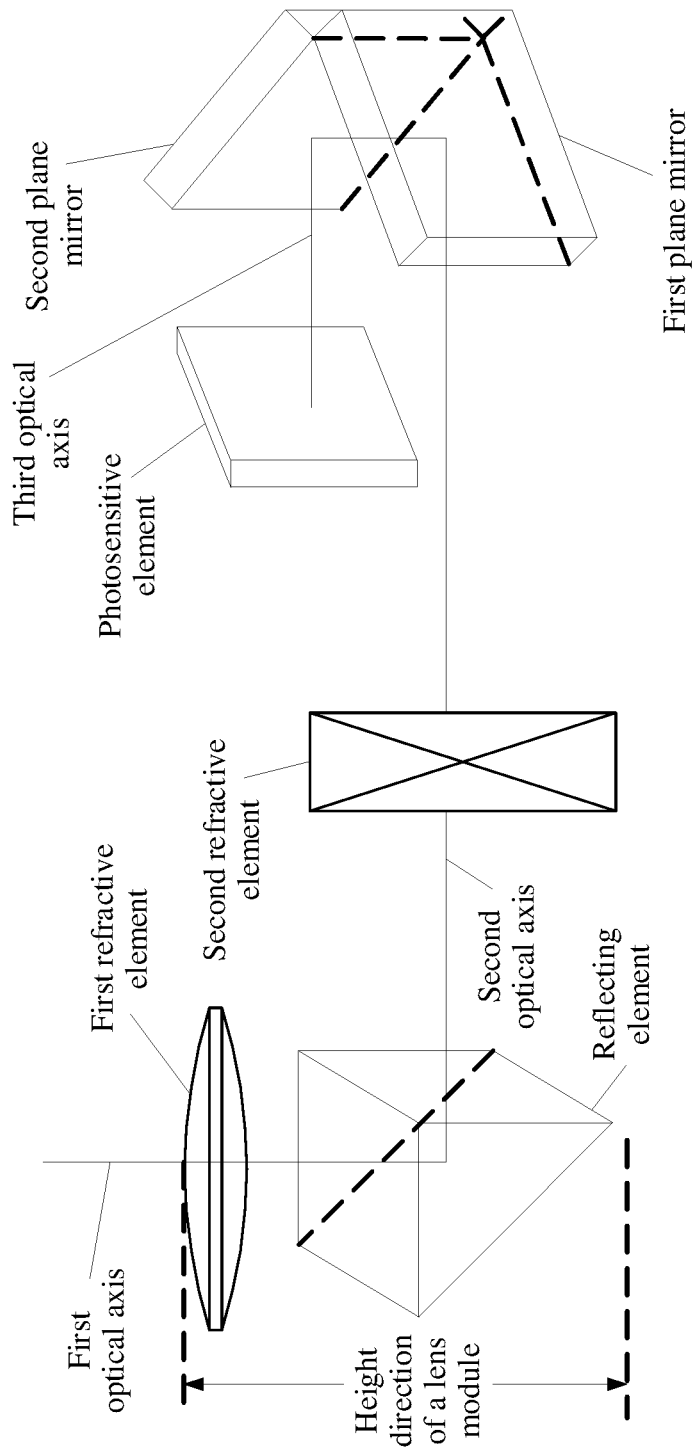
FIG. 5A is a schematic diagram of another embodiment of a camera according to this application.

Refer to FIG. 5A. The target optical element may alternatively include a first plane mirror and a second plane mirror. The first plane mirror is perpendicular to the second plane mirror. The second refractive element and the first plane mirror are disposed along the direction of the second optical axis. The second refractive element is located between the reflecting element and the first plane mirror. The second plane mirror and the photosensitive element are disposed along a direction of a third optical axis, and the third optical axis is parallel to the second optical axis. An included angle between the first plane mirror and the second optical axis is 45° and an included angle between the second plane mirror and the second optical axis is 45°. Further, the light ray refracted by the second refractive element is projected onto the photosensitive element after being reflected by the first plane mirror and the second plane mirror in sequence. A symmetry axis of a light beam between the second plane mirror and the photosensitive element may coincide with or be parallel to the third optical axis.

Optionally, the second refractive element and the photosensitive element may be parallel to each other, or may be in a same plane. This is not limited herein.

Figure 5B:
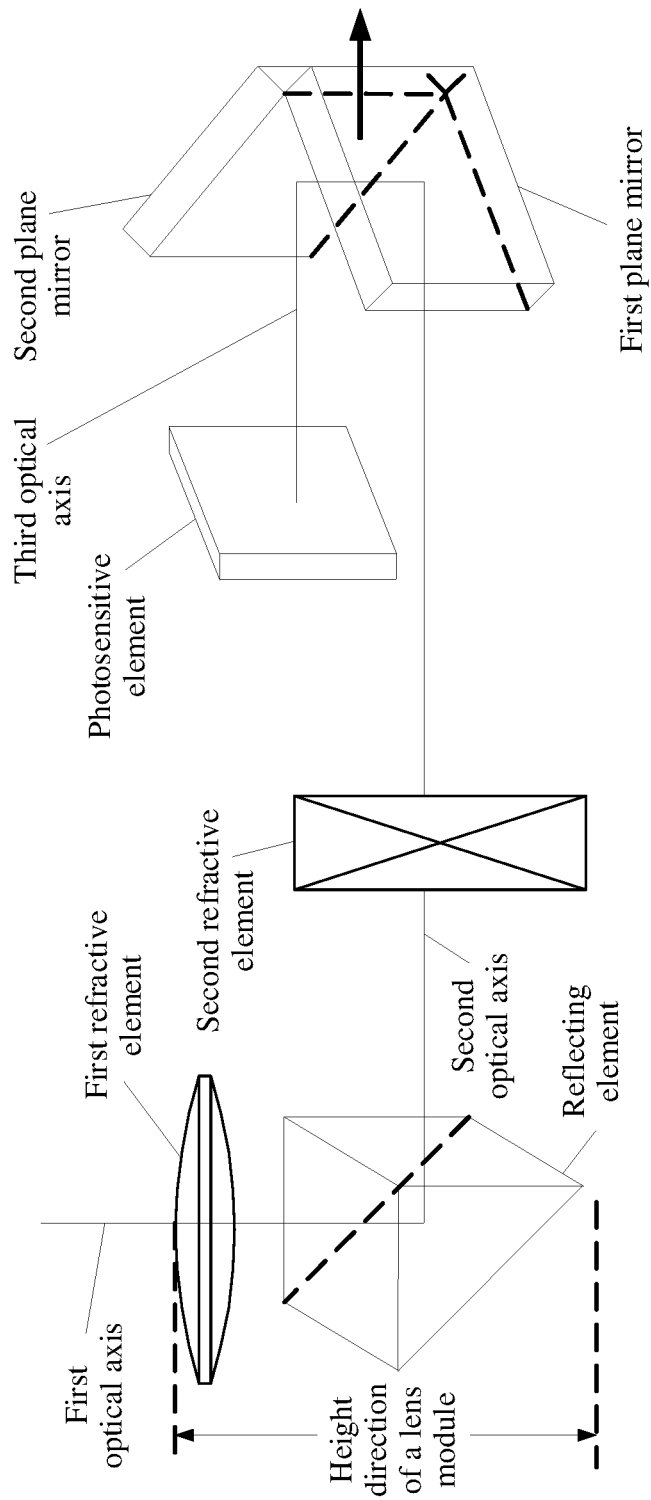
FIG. 5B is a schematic diagram of another embodiment of a camera according to this application.

It should be noted that the motor may push both the first plane mirror and the second plane mirror to synchronously move along the direction of the second optical axis, to change an effective length of the optical path between the second refractive element and the photosensitive element to implement the focusing function. For details, refer to FIG. 5B.

Optionally, in this solution, the motor may alternatively push only the second plane mirror to move along the direction of the second optical axis, to change an effective length of the optical path between the second refractive element and the photosensitive element to implement the focusing function.

Optionally, in this solution, the motor may alternatively push only the first plane mirror to move along the direction of the second optical axis, to change an effective length of the optical path between the second refractive element and the photosensitive element to implement the focusing function.

Figure 6A:
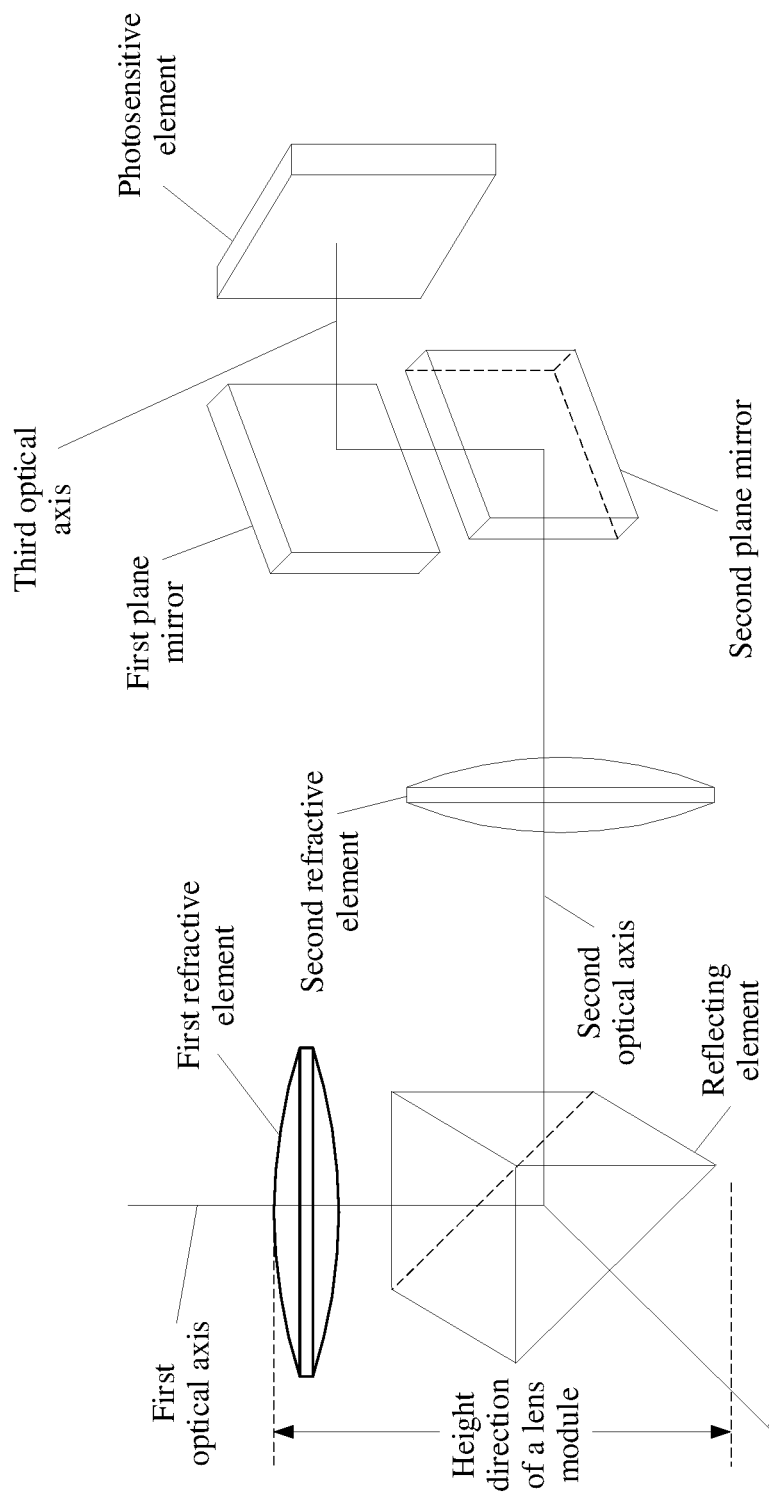
FIG. 6A is a schematic diagram of another embodiment of a camera according to this application.

Refer to FIG. 6A. The target optical element may alternatively include a first plane mirror and a second plane mirror. The first plane mirror is parallel to the second plane mirror. The second refractive element and the first plane mirror are disposed along the direction of the second optical axis. The second refractive element is located between the reflecting element and the first plane mirror. The second plane mirror and the photosensitive element are disposed along a direction of a third optical axis, and the third optical axis is parallel to the second optical axis. An included angle between the first plane mirror and the second optical axis is 45° and an included angle between the second plane mirror and the second optical axis is 45°. The first plane mirror and the second plane mirror are located between the second refractive element and the photosensitive element. Further, the light ray refracted by the second refractive element is projected onto the photosensitive element after being reflected by the first plane mirror and the second plane mirror in sequence. A symmetry axis of a light beam between the second plane mirror and the photosensitive element may coincide with or be parallel to the third optical axis.

Figure 6B:
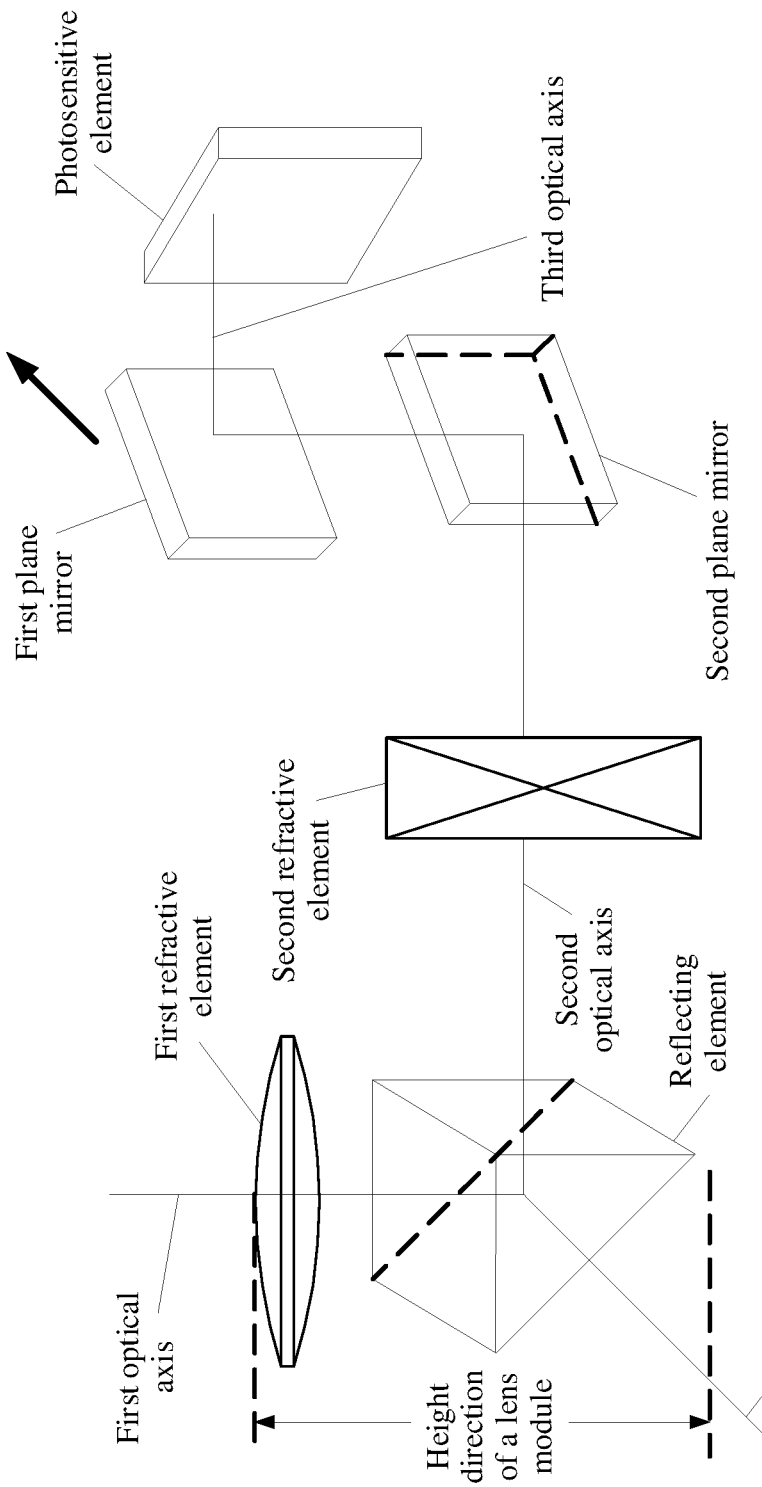
FIG. 6B is a schematic diagram of another embodiment of a camera according to this application.

It should be noted that the motor may push the first plane mirror to move along a direction of a target axis. The target axis is perpendicular to both the first optical axis and the second optical axis. It may be understood that, if the first optical axis is a Y axis and the second optical axis is an X axis, the target axis is a Z axis. That is, the first plane mirror does not move in a plane, but moves in three-dimensional space. In this way, a distance between the first plane mirror and the second plane mirror may be changed, that is, an effective length of the optical path between the second refractive element and the photosensitive element may be changed, to implement the focusing function. For details, refer to FIG. 6B.

Optionally, in this solution, the motor may alternatively push the second plane mirror to move along a direction of a target axis, to change an effective length of the optical path between the second refractive element and the photosensitive element to implement the focusing function.

Optionally, in this solution, the motor may alternatively push both the first plane mirror and the second plane mirror to move along a direction of a target axis to change a distance between the first plane mirror and the second plane mirror, to change an effective length of the optical path between the second refractive element and the photosensitive element to implement the focusing function.

Figure 7A:
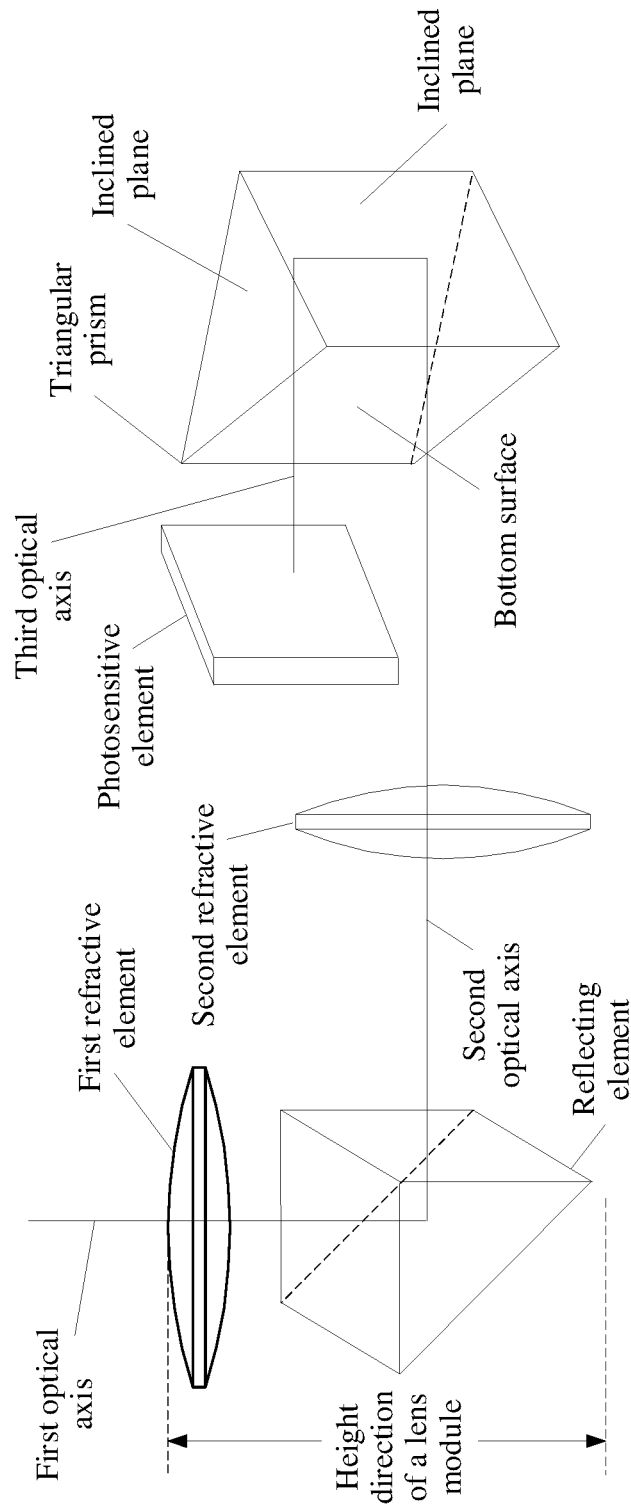
FIG. 7A is a schematic diagram of another embodiment of a camera according to this application.

Refer to FIG. 7A. The target optical element may alternatively include a triangular prism. The second refractive element is disposed along the direction of the second optical axis. The photosensitive element is disposed along a direction of a third optical axis, and the third optical axis is parallel to the second optical axis. The triangular prism is disposed on a same side of the second refractive element and the photosensitive element, and a bottom surface of the triangular prism is parallel to the second refractive element and the photosensitive element. A symmetry axis of a light beam between the triangular prism and the photosensitive element may coincide with or be parallel to the third optical axis.

Figure 7B:
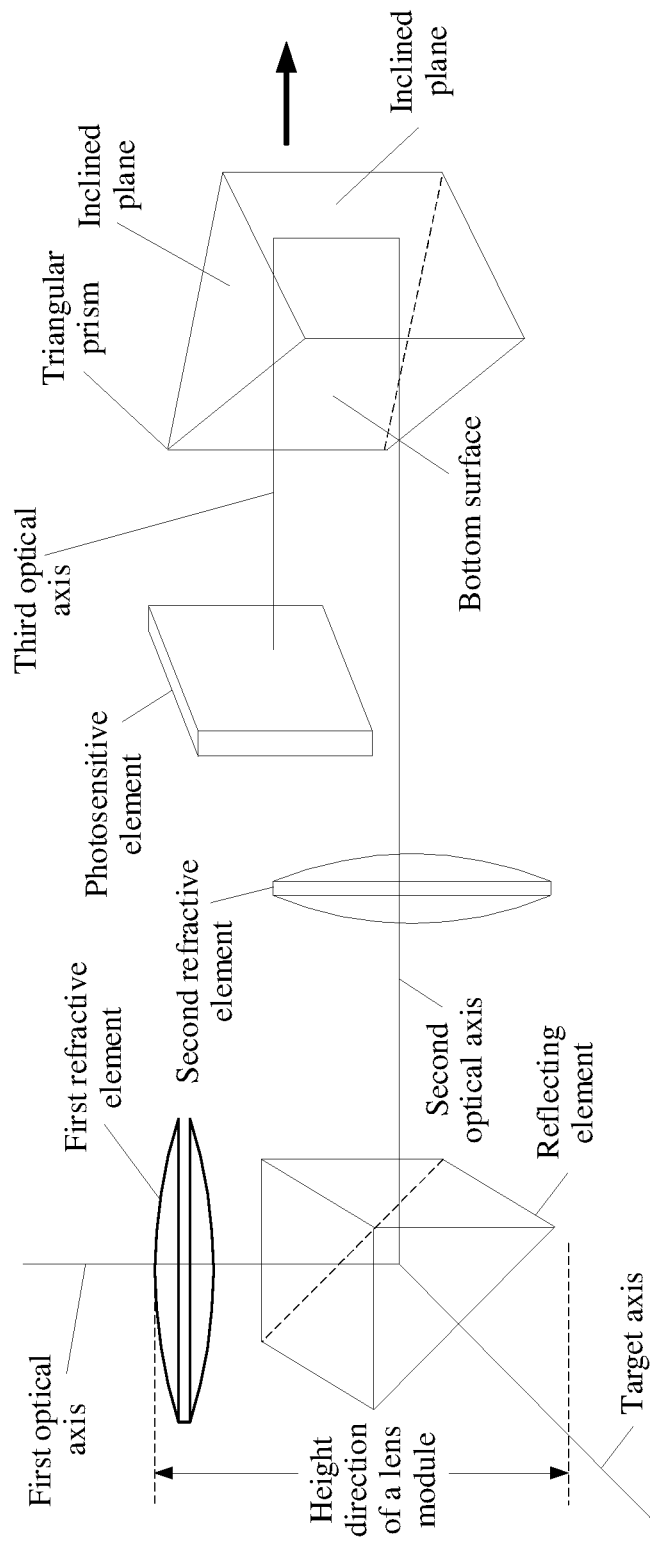
FIG. 7B is a schematic diagram of another embodiment of a camera according to this application.

It should be noted that the light ray refracted by the second refractive element first passes through the bottom surface of the triangular prism and then is projected onto the photosensitive element after being reflected by two inclined planes of the triangular prism. The motor pushes the triangular prism to move along the direction of the second optical axis, to change an effective length of the optical path between the second refractive element and the photosensitive element to implement the focusing function. For details, refer to FIG. 7B.

Optionally, the second refractive element and the photosensitive element may be parallel to each other, or may be in a same plane. This is not further limited herein.

The foregoing describes several specific forms of the target optical element for implementing the focusing function of the lens module. The following describes, with reference to the accompanying drawings, several specific forms of the target optical element for implementing the image stabilization function of the lens module.

Figure 8:
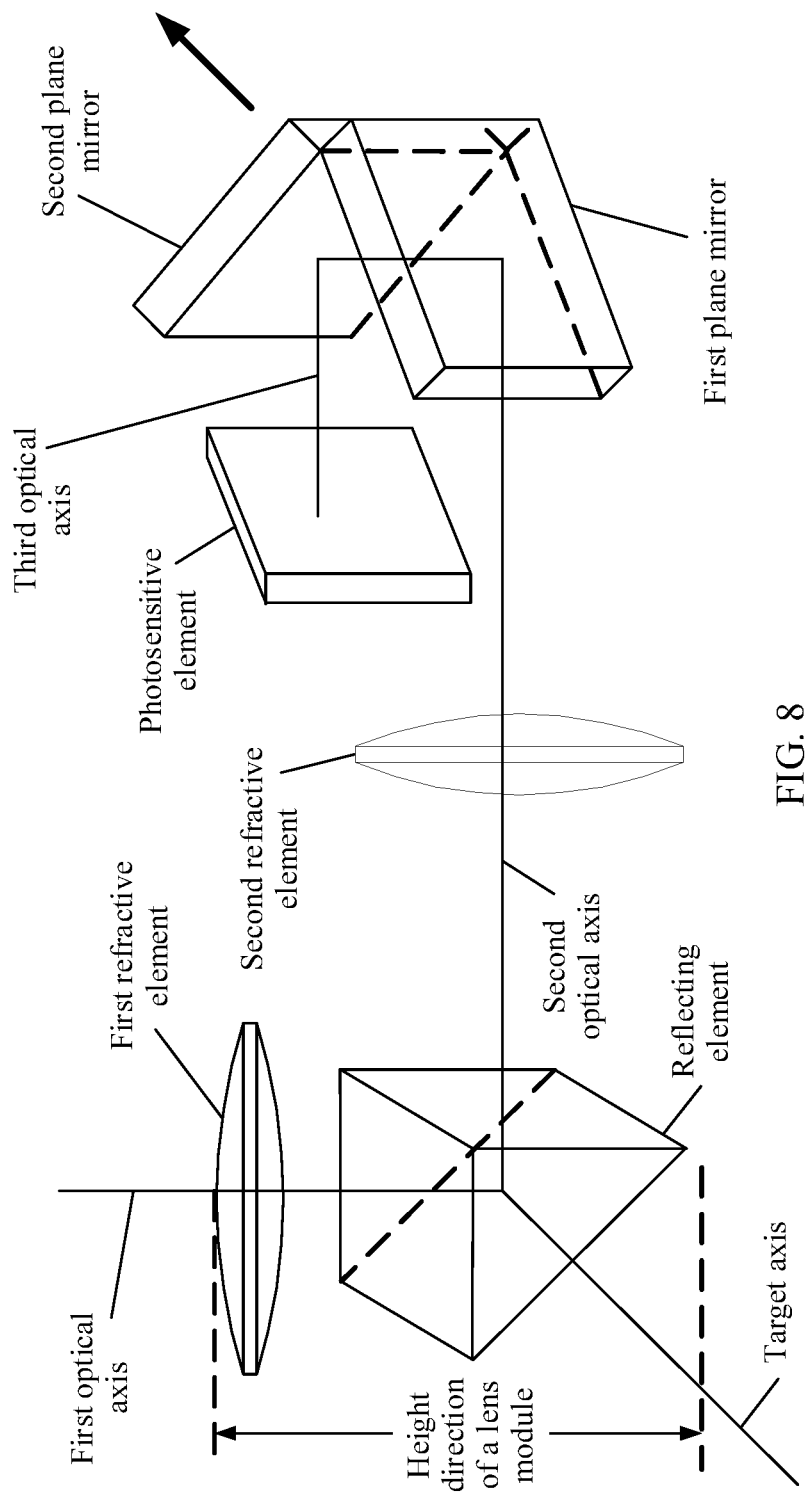
FIG. 8 is a schematic diagram of another embodiment of a camera according to this application.

Refer to FIG. 8. The target optical element may be in the form shown in FIG. 5A. To be specific, the target optical element may include a first plane mirror and a second plane mirror. The first plane mirror is perpendicular to the second plane mirror. The second refractive element and the first plane mirror are disposed along the direction of the second optical axis. The second refractive element is located between the reflecting element and the first plane mirror. The second plane mirror and the photosensitive element are disposed along a direction of a third optical axis, and the third optical axis is parallel to the second optical axis. An included angle between the first plane mirror and the second optical axis is 45° and an included angle between the second plane mirror and the second optical axis is 45°. Further, the light ray refracted by the second refractive element is projected onto the photosensitive element after being reflected by the first plane mirror and the second plane mirror in sequence. A symmetry axis of a light beam between the second plane mirror and the photosensitive element may coincide with or be parallel to the third optical axis.

It should be noted that, when the lens module shakes due to an external factor, the motor may push the first plane mirror and the second plane mirror to synchronously move along a direction of a target axis. The target axis is perpendicular to both the first optical axis and the second optical axis. That is, in the foregoing manner, an optical path that changes due to shaking can be compensated for, to reduce a blurring degree of imaging.

Figure 9:
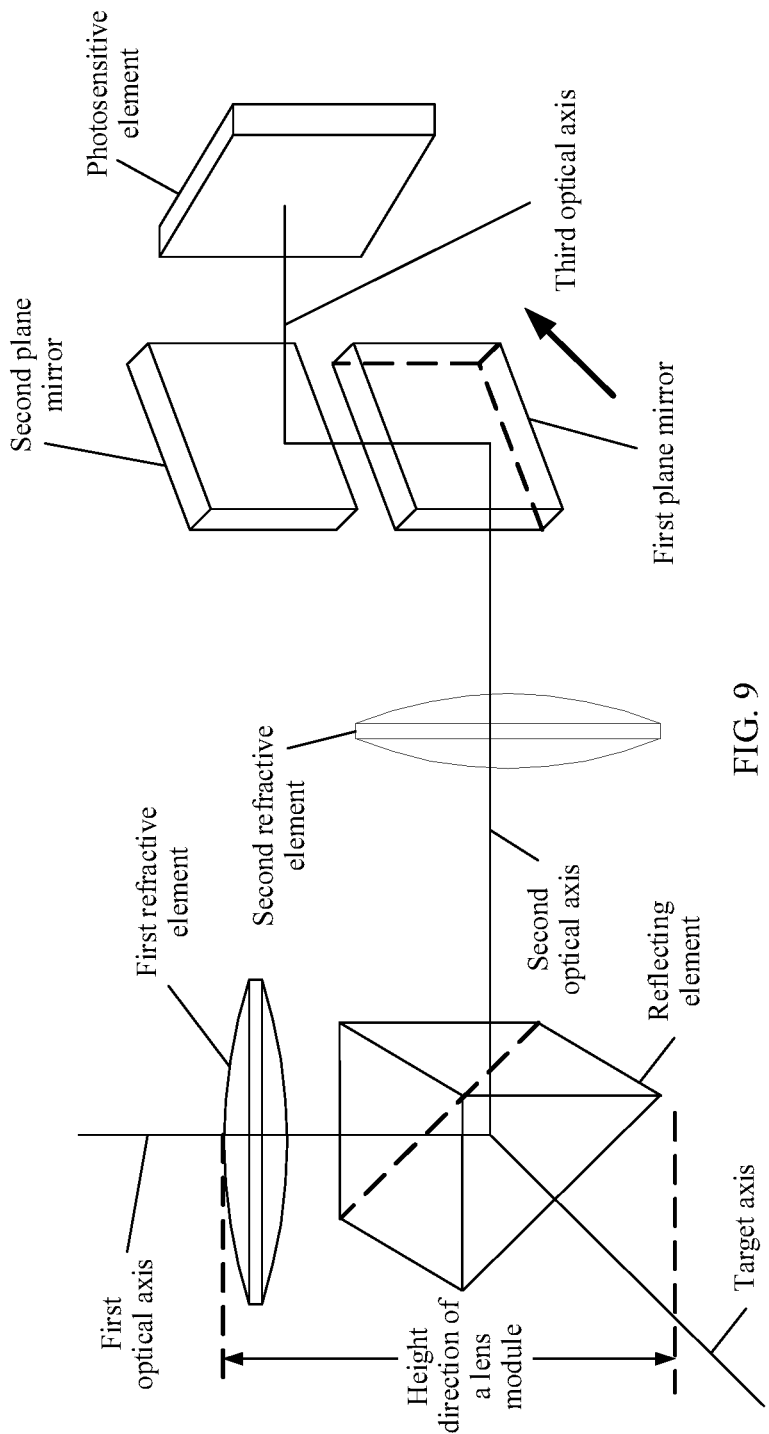
FIG. 9 is a schematic diagram of another embodiment of a camera according to this application.

Refer to FIG. 9. The target optical element may alternatively be in the form shown in FIG. 6A. To be specific, the target optical element may include a first plane mirror and a second plane mirror. The first plane mirror is parallel to the second plane mirror. The second refractive element and the first plane mirror are disposed along the direction of the second optical axis. The second refractive element is located between the reflecting element and the first plane mirror. The second plane mirror and the photosensitive element are disposed along a direction of a third optical axis, and the third optical axis is parallel to the second optical axis. An included angle between the first plane mirror and the second optical axis is 45° and an included angle between the second plane mirror and the second optical axis is 45°. The first plane mirror and the second plane mirror are located between the second refractive element and the photosensitive element. Further, the light ray refracted by the second refractive element is projected onto the photosensitive element after being reflected by the first plane mirror and the second plane mirror in sequence. A symmetry axis of a light beam between the second plane mirror and the photosensitive element may coincide with or be parallel to the third optical axis.

It should be noted that, when the lens module shakes due to an external factor, the motor may push the first plane mirror and the second plane mirror to synchronously move along a direction of a target axis. The target axis is perpendicular to both the first optical axis and the second optical axis. That is, in the foregoing manner, an optical path that changes due to shaking can be compensated for, to reduce a blurring degree of imaging.

Figure 10:
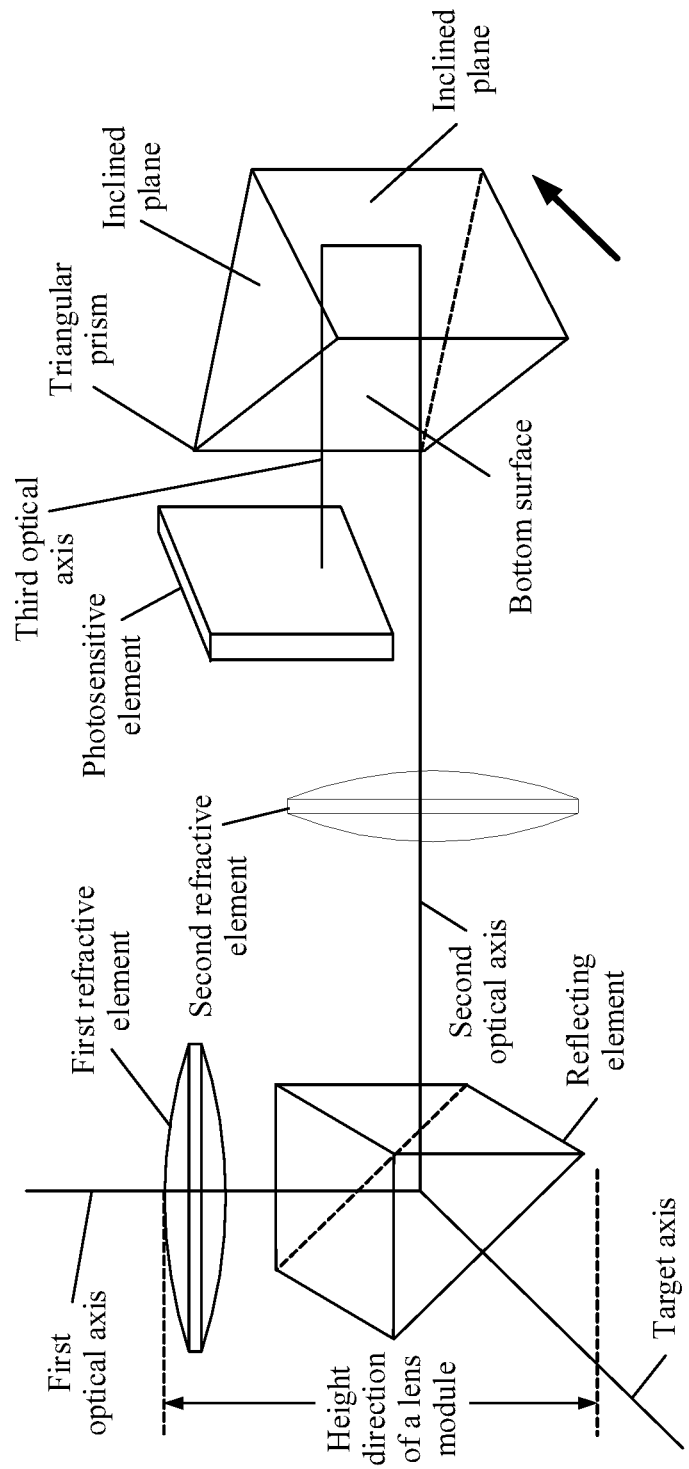
FIG. 10 is a schematic diagram of another embodiment of a camera according to this application.

Refer to FIG. 10. The target optical element may alternatively be in the form shown in FIG. 7A. To be specific, the target optical element may include a triangular prism. The second refractive element is disposed along the direction of the second optical axis. The photosensitive element is disposed along a direction of a third optical axis, and the third optical axis is parallel to the second optical axis. The triangular prism is disposed on a same side of the second refractive element and the photosensitive element, and a bottom surface of the triangular prism is parallel to the second refractive element and the photosensitive element. A symmetry axis of a light beam between the triangular prism and the photosensitive element may coincide with or be parallel to the third optical axis.

It should be noted that, when the lens module shakes due to an external factor, the motor may push the triangular prism to move along a direction of a target axis. The target axis is perpendicular to both the first optical axis and the second optical axis. That is, in the foregoing manner, an optical path that changes due to shaking can be compensated for, to reduce a blurring degree of imaging.

It should be noted that the lens module including the target optical element may include but does not necessarily include an infrared cut-off filter located between the target optical element and the photosensitive element. The infrared cut-off filter may be made of the fiber glass material.

In addition, the image stabilization function of the lens module may be implemented in the foregoing manner, or may be implemented by adjusting the reflecting element. The following provides specific descriptions with reference to the accompanying drawings.

Figure 11:
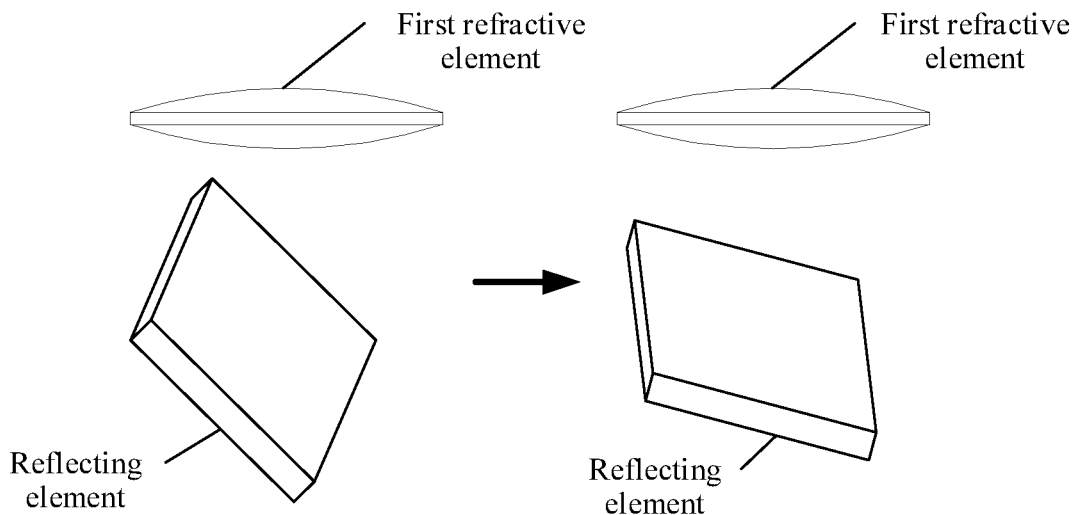
FIG. 11 is a schematic diagram of an embodiment of implementing an image stabilization function by adjusting a reflecting element in a camera according to this application.

Refer to FIG. 11. The reflecting element may be a plane mirror. When the lens module shakes due to the external factor, an included angle between the plane mirror and the first refractive element is changed using the motor. That is, in the foregoing manner, an optical path that changes due to shaking can be compensated for, to reduce a blurring degree of imaging.

Figure 12:
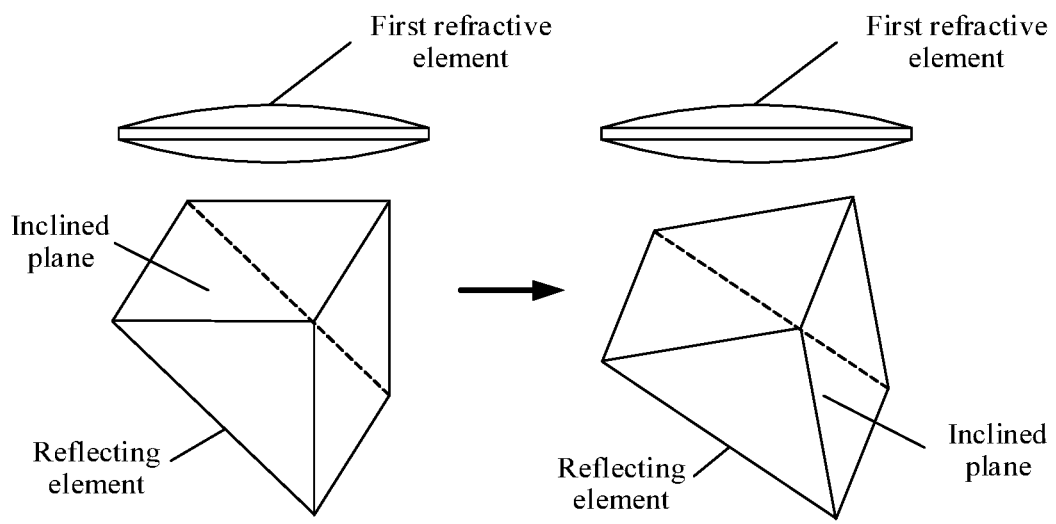
FIG. 12 is a schematic diagram of another embodiment of implementing an image stabilization function by adjusting a reflecting element in a camera according to this application.

Refer to FIG. 12. The reflecting element may alternatively be a prism. When the lens module shakes due to the external factor, an included angle between an inclined plane of the prism and the first refractive element is changed using the motor. That is, in the foregoing manner, an optical path that changes due to shaking can be compensated for, to reduce a blurring degree of imaging.

It should be noted that, for the motor mentioned in the foregoing embodiments, one motor may be used in actual application. That is, the motor is controlled to push a related optical element, to implement the focusing function and the image stabilization function. Alternatively, different motors may be used, for example, an autofocus motor for implementing the focusing function and an image stabilization motor for implementing the image stabilization function. That is, the autofocus motor is started to push a related optical element, to implement the focusing function, and the image stabilization motor is started to push a related optical element, to implement the image stabilization function.

An embodiment of this application further provides a camera. The camera may be a component of a terminal device. The following provides descriptions using an example in which the terminal device is a mobile phone.

Figure 13:
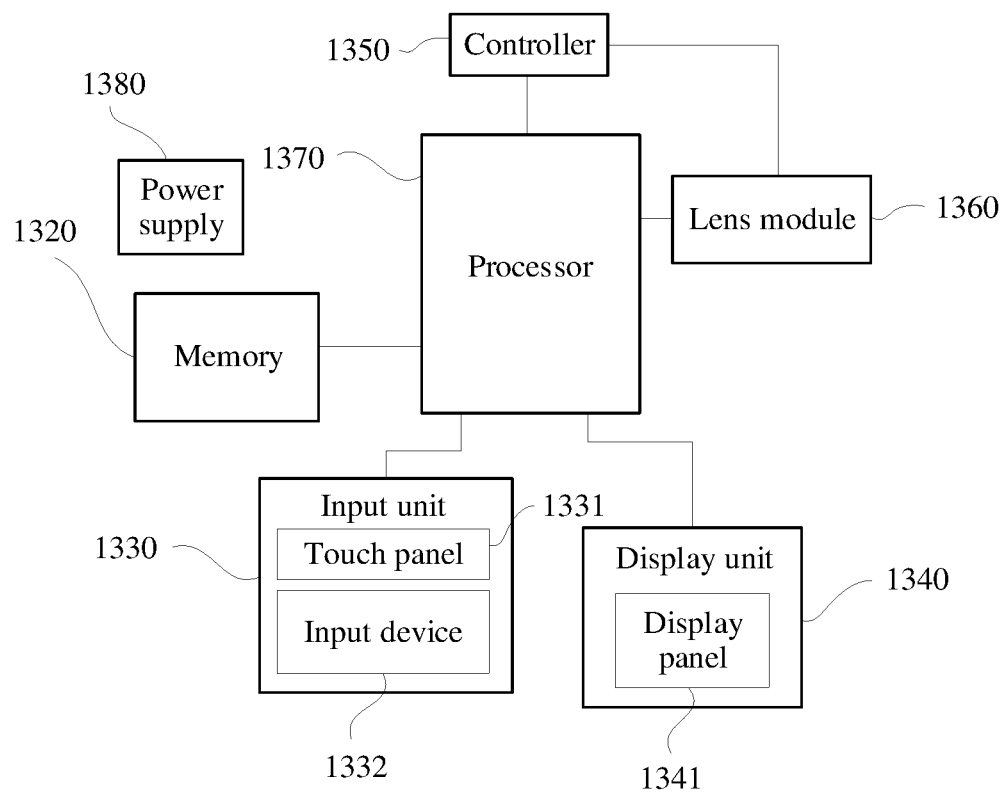
FIG. 13 is a schematic structural diagram of a terminal device according to this application.

FIG. 13 is a block diagram of a partial structure of a mobile phone related to a camera provided in an embodiment of this application. Refer to FIG. 13. The mobile phone includes components such as a memory 1320, an input unit 1330, a display unit 1340, a controller 1350, a lens module 1360, a processor 1370, and a power supply 1380. A person skilled in the art may understand that the structure of the mobile phone shown in FIG. 13 does not constitute a limitation on the mobile phone, and the mobile phone may include more or fewer components than those shown in the figure, combine some components, or have different component arrangements.

Each component of the mobile phone is described below with reference to FIG. 13.

The memory 1320 may be configured to store a software program and a module. The processor 1370 runs the software program and the module stored in the memory 1320 to perform various function applications of the mobile phone and data processing. The memory 1320 may mainly include a program storage area and a data storage area. The program storage area may store an operating system, an application program required by at least one function (such as a voice playing function and an image playing function), and the like. The data storage area may store data (such as audio data and an address book) created based on use of the mobile phone, and the like. In addition, the memory 1320 may include a high-speed random-access memory (RAM), and may further include a nonvolatile memory, for example, at least one magnetic disk storage device, a flash memory device, or another volatile solid-state storage device.

The input unit 1330 may be configured to receive entered digit or character information, and generate a key signal input related to user setting and function control of the mobile phone. Further, the input unit 1330 may include a touch panel 1331 and an input device 1332. The touch panel 1331, also referred to as a touchscreen, can collect a touch operation performed by a user on or near the touch panel 1331 (for example, an operation performed by the user on or near the touch panel 1331 using any proper object or accessory such as a finger or a tablet pen), and drive a corresponding connection apparatus according to a preset program. Optionally, the touch panel 1331 may include two parts a touch detection apparatus and a touch controller. The touch detection apparatus detects a touch position of the user, detects a signal generated by the touch operation, and transmits the signal to the touch controller. The touch controller receives touch information from the touch detection apparatus, converts the touch information into coordinates of a touch point, and then sends the coordinates of the touch point to the processor 1370. The touch controller can receive and execute a command sent by the processor 1370. In addition, the touch panel 1331 may be implemented in a plurality of types, such as a resistive type, a capacitive type, an infrared type, and a surface acoustic wave type. In addition to the touch panel 1331, the input unit 1330 may further include the input device 1332. Further, the input device 1332 may include but is not limited to one or more of a physical keyboard, a function key (for example, a volume control key or a power on/off key), a trackball, a mouse, a joystick, or the like.

The display unit 1340 may be configured to display information entered by the user or information provided for the user, and various menus of the mobile phone. In this embodiment of this application, the display unit 1340 is mainly configured to display an image obtained through photographing. The display unit 1340 may include a display panel 1341. Optionally, the display panel 1341 may be configured in a form of a liquid-crystal display (LCD), an organic light-emitting diode (OLED), or the like. Further, the touch panel 1331 may cover the display panel 1341. When detecting the touch operation on or near the touch panel 1331, the touch panel 1331 transmits the touch operation to the processor 1370 to determine a type of a touch event. Then, the processor 1370 provides a corresponding visual output on the display panel 1341 based on the type of the touch event. In FIG. 13, the touch panel 1331 and the display panel 1341 are used as two independent components to implement input and output functions of the mobile phone. However, in some embodiments, the touch panel 1331 and the display panel 1341 may be integrated to implement the input and output functions of the mobile phone.

The controller 1350 may be configured to control an autofocus motor and an image stabilization motor of the lens module to push a related optical element, to implement focusing and image stabilization functions of the camera.

The lens module 1360 may be the lens module described in any one of the embodiments corresponding to FIG. 2 to FIG. 10.

As a control center of the mobile phone, the processor 1370 connects all parts of the entire mobile phone through various interfaces and lines, and runs or executes the software program and/or the module stored in the memory 1320 and invokes data stored in the memory 1320 to perform various functions of the mobile phone and data processing, to perform overall monitoring on the mobile phone. In this embodiment of this application, the processor is mainly configured to invoke a program and an instruction stored in the memory, and control the lens module using the controller. Optionally, the processor 1370 may include one or more processing units. Preferably, an application processor and a modem processor may be integrated into the processor 1370. The application processor mainly processes the operating system, a user interface, an application program, and the like. The modem processor mainly processes wireless communication. It may be understood that the modem processor may not be integrated into the processor 1370. In this embodiment of this application, the processor 1370 may be further configured to denoise, enhance, segment, and blur an image.

The mobile phone further includes the power supply 1380 (such as a battery) for supplying power to the components of the mobile phone. Preferably, the power supply may be logically connected to the processor 1370 using a power management system, to implement functions such as charging, discharging and power consumption management using the power management system.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A lens system comprising:
   a first refractive element disposed along a first direction of a first optical axis and comprising a first effective aperture diameter, wherein the first optical axis is of the first refractive element and is parallel to a height direction of the lens system, and wherein the first refractive element is configured to refract a light beam from outside of the lens system to create a first refracted light beam;
   a reflecting element disposed along the first direction and a second direction of a second optical axis and configured to reflect the first refracted light beam to create a first reflected light beam, wherein the second direction is perpendicular to the first direction;
   a target optical element comprising a first plane mirror and a second plane mirror that are perpendicularly disposed, wherein the first plane mirror is disposed along the second direction, and wherein the second plane mirror is disposed along a third direction along a third optical axis that is parallel to the second optical axis;
   a second refractive element disposed along the second direction and located between the reflecting element and the first plane mirror, wherein the second refractive element comprises a second effective aperture diameter, wherein the first effective aperture diameter is greater than the second effective aperture diameter in the height direction, wherein the second optical axis is of the second refractive element and is perpendicular to the first optical axis and to the height direction, and wherein the second refractive element is configured to refract the first reflected light beam to create a second refracted light beam;
   a photosensitive element disposed along the third direction of the third optical axis, wherein the photosensitive element is configured to:
     receive a light ray emitted from the target optical element; and
     generate an electronic image based on the light ray emitted from the target optical element; and
   a motor configured to adjust a position of the target optical element to change a first optical path between the second refractive element and the photosensitive element, wherein the first plane mirror is configured to reflect the second refracted light beam to project onto the second plane mirror, and wherein the second plane mirror is configured to reflect the second refracted light beam that is projected onto the second plane mirror along the third optical axis and directly on the photosensitive element.

2. The lens system of claim 1, wherein a first included angle between the first plane mirror and the second optical axis is 45°, wherein a second included angle between the second plane mirror and the second optical axis is 45°, and wherein the motor is further configured to adjust a third position of the first plane mirror or a fourth position of the second plane mirror to change an optical path of a light ray in the target optical element.

3. The lens system of claim 2, wherein the motor is further configured to adjust the third position and the fourth position to change the optical path of the light ray in the target optical element when the lens system shakes.

4. The lens system of claim 1, wherein the first refractive element comprises first refractive lenses that are parallel to each other, and wherein the second refractive element comprises second refractive lenses that are parallel to each other.

5. The lens system of claim 1, wherein the reflecting element is a plane mirror, and wherein the motor is further configured to adjust a third included angle between the plane mirror and the first refractive element to change an optical path between the first refractive element and the second refractive element when the lens system shakes.

6. The lens system of claim 1, wherein the reflecting element is a prism, and wherein the motor is further configured to adjust a fourth included angle between the prism and the first refractive element to change an optical path between the first refractive element and the second refractive element when the lens system shakes.

7. The lens system of claim 1, wherein a physical focal length of the lens system is greater than or equal to 9 millimeters (mm), and wherein an optical magnification of the lens system is greater than or equal to a ratio of 1:2.5.

8. The lens system of claim 1, further comprising an infrared cut-off filter located between the target optical element and the photosensitive element.

9. A camera comprising:
  a lens system comprising:
    a first refractive element disposed along a first direction of a first optical axis and comprising a first effective aperture diameter, wherein the first optical axis is of the first refractive element and is parallel to a height direction of the lens system, and wherein the first refractive element is configured to refract a light beam from outside of the lens system to create a first refracted light beam;
    a reflecting element disposed along the first direction and a second direction of a second optical axis and configured to reflect the first refracted light beam to create a first reflected light beam;
    a target optical element comprising a first plane mirror and a second plane mirror that are perpendicularly disposed, wherein the first plane mirror is disposed along the second direction, and wherein the second plane mirror is disposed along a third direction along a third optical axis that is parallel to the second optical axis;
    a second refractive element disposed along the second direction and located between the reflecting element and the first plane mirror, wherein the second refractive element comprises a second effective aperture diameter, wherein the first effective aperture diameter is greater than the second effective aperture diameter in the height direction, wherein the second optical axis is of the second refractive element and is perpendicular to the first optical axis and to the height direction, and wherein the second refractive element is configured to refract the first reflected light beam to create a second refracted light beam;
    a photosensitive element disposed along the third direction of the third optical axis, wherein the photosensitive element is configured to:
      receive a light ray emitted from the target optical element; and
      generate an electronic image based on the light ray emitted from the target optical element; and
    a motor configured to adjust a position of the target optical element to change a first optical path between the second refractive element and the photosensitive element, wherein the first plane mirror is configured to reflect the second refracted light beam to project onto the second plane mirror, and wherein the second plane mirror is configured to reflect the second refracted light beam that is projected onto the second plane mirror along the third optical axis and directly on the photosensitive element;
  a controller coupled to the lens system; and
  a processor coupled to the controller and configured to control the lens system using the controller.

10. A method, comprising:
disposing a first refractive element of a lens system along a first direction of a first optical axis of the lens system, wherein the first optical axis is parallel to a height direction of the lens system;
disposing a reflecting element of the lens system along the first direction and a second direction of a second optical axis, wherein the second optical axis is perpendicular to the first optical axis and to the height direction;
refracting, with the first refractive element, a light beam from outside of the lens system to create a first refracted light beam;
reflecting, with the reflecting element, the first refracted light beam to create a first reflected light beam;
disposing a first plane mirror of a target optical element of the lens system along the second direction;
disposing a second plane mirror of the target optical element that is perpendicular to the first plane mirror along a third direction along a third optical axis and that is parallel to the second optical axis;
disposing a second refractive element of the lens system along the second direction and between the reflecting element and the first plane mirror;
refracting, with the second refractive element, the first reflected light beam to create a second refracted light beam;
disposing a photosensitive element of the lens system along the third direction of the third optical axis;
receiving, with the photosensitive element, a light ray from the target optical element;
generating an electronic image based on the light ray; and
adjusting, with a motor of the lens system, a position of the target optical element to change a first optical path between the second refractive element and the photosensitive element;
reflecting, with the first plane mirror, the second refracted light beam to project onto the second plane mirror;
reflecting, with the second plane mirror, the second refracted light beam that is projected onto the second plane mirror along the third optical axis and directly on the photosensitive element; and
controlling, with a controller of the lens system, the lens system.

11. The method of claim 10, further comprising adjusting, with the motor, a third position of the first plane mirror and a fourth position of the second plane mirror to change an optical path of the light ray in the target optical element when the lens system shakes.

* * * * *